March 26, 1968

J. H. HART 3,374,555

TEACHING DEVICE

Filed Nov. 9, 1965

JAMES H. HART
*INVENTOR.*

BY *Edward A. Gordon*

ATTORNEY

United States Patent Office 3,374,555
Patented Mar. 26, 1968

1

3,374,555
TEACHING DEVICE
James H. Hart, 4 Rocky Hill Road,
Andover, Mass. 01810
Filed Nov. 9, 1965, Ser. No. 506,931
6 Claims. (Cl. 35—18)

ABSTRACT OF THE DISCLOSURE

An apparatus for demonstrating the theory of chemical valence having a support with openings in the support. A plurality of rotatable members having chemical indicia thereon are positioned adjacent the support so that when rotated the chemical indicia is brought into register with the openings. Elongated adjustable members are provided for connection between opposite valence charges of the chemical indicia to represent satisfaction of the valence charges between reactants.

This invention relates to teaching devices and more particularly to a device for teaching valence theory of chemical reactions.

Usual information of the valence theory of chemical reactions is obtained by the study of descriptive matter conained in text books and scientific articles which are more or less obscure because of their technical character and difficulty of appreciation.

Accordingly, a main object of the present invention is to provide a device which visually demonstrates the valence theory involved in chemical reactions and combinations and which can be readily manipulated from one chemical formula to another.

Another object of the present invention is to provide means which are appropriately designated to represent chemical elements and radicals having a positive valence charge and chemical elements and radicals having a negative valence charge.

Another object of the present invention is to provide means which arouse and sustain the interest of a student in the subject matter being taught, to clarify the topic because of its visual reality, to impress the valence theory more firmly in the mind of the student by giving him something concrete which will recall the valence theory more readily and which will tend to decrease the amount of time required to teach the valence theory.

A further object of the present invention is to provide a valence teaching device which presents the valence theory in one plane and which can be completely observed by the viewer facing the plane of presentation.

As briefly stated, valence is the combining power of an atom or radical. The hydrogen atom valence 1 is the standard for the valence of other atoms. Different valences are due to the number of electrons that an atom will give, take, or share in pairs when it reacts or combines with other atoms.

Other objects of this invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

2

For a fuller understanding of the nature and objects of the invention, reference should be had to the following detailed description taken in connection with the accompanying drawing wherein.

Figure 1:
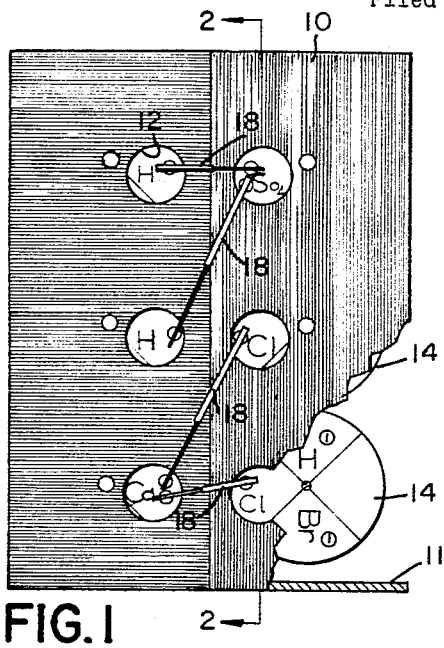
FIG. 1 is a front fragmentary view of a device embodying the invention.
Figure 2:
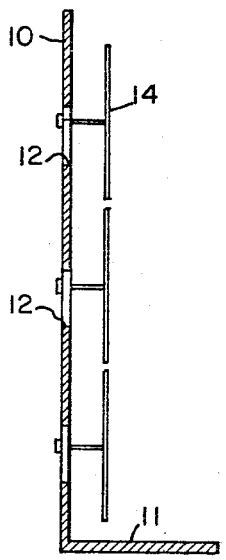
FIG. 2 is a side view of FIG. 1.
Figure 3:
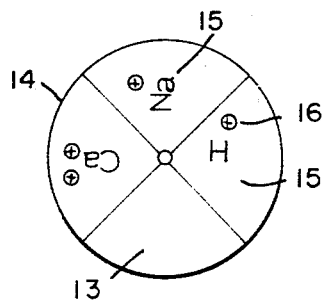
FIG. 3 is an enlarged schematic view illustrating one embodiment of a disk showing chemical elements having a positive valence.

In accordance with the present invention, there is provided a teaching apparatus especially adapted for demonstrating and explaining the valence theory involved in chemical reactions and combinations. In the preferred embodiment of the present invention, reference being had to the drawing, there is provided a display panel or support member 10 having a base 11, openings 12, and disks 14. The support member 10 is preferably provided with a magnetically attractive surface. The disks 14 are preferably provided with indicia 15 to designate chemical elements and radicals of positive valence, and chemical elements and radicals of negative valence. It is to be understood that the terms chemical elements and radicals include respectively atoms and groups of atoms each of which may have positive or negative valences. The disks 14, are mounted relative to the openings 12 on the support member 10 so as to be rotatable relative thereto and arranged to expose a portion of the disk so that it may be viewed through the opening from the opposite side of the support. Thus by rotating the disk each indicia is brought respectively into register with the opening 12. Each disk is provided with indicia 16 to show the number of positive (+) or negative (−) electrons that an atom or group of atoms tends to acquire or give up in chemical combinations. Indicia 15 are used to show the chemical symbol for an atom of the element or for a group of atoms such as radicals. The indicia of the elements and radicals are visible individually through the openings 12 upon rotating the disk. Preferably, each disk is provided with elements and radicals of the same valence, that is for example, all positive valences.

In the preferred embodiment of the present invention the indicia 16 are preferably positive (+) or negative (−) signs which correspond in number to the valence electrons of the particular elements and radicals. For monovalent elements and radicals with one (+) electron such as K, Na, Li, H, and $NH_4$, one positive valence sign is provided on the disk. For monovalent elements and radicals with one negative (−) electron or ion such as F, Cl, Br, OH. $ClO_2$ and $NO_3$, one negative sign is provided on the disks.

For divalent elements and radicals with two positive (+) valence charges such as Mg, Ca, Cd, two positive signs are provided on the disks. Disks used for divalent elements and radicals having two negative (−) electrons such as O, $SO_4$ are provided with two negative signs valence areas.

In a like manner disks are provided for elements and radicals having three or more valence charges, the disks having indicia corresponding in number to the valence charges of the particular elements and radicals.

Elements which have two or more different valences such as Fe, which has positive valences of 2 and 3 are preferably represented as separate indicia on a single disk. Elements which have two or more different valences such as S, which has a positive valence of 6 in some instances and a negative valence of 2 in other instances, are preferably represented by separate disks for the positive and negative valences.

Additionally the disks are preferably provided with a blank space 13 so no indicia will be seen when desired.

Figure 4:
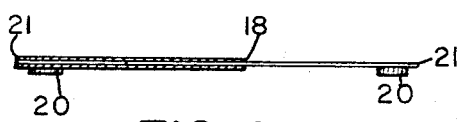
FIG. 4 is a perspective view of one embodiment of a valence bond.

When two or more chemical elements or radicals combine or react the valence charges are normally satisfied. In accordance with the present invention, reference being had to FIG. 4, the valence bonds are preferably represented by elongated members 18. In the preferred embodiment the elongated members 18 are provided with magnetic surfaces 20 for attachment to the magnetically attractive panel 10.

The elongated members are preferably constructed and arranged so that when the surface 20 is attached to the panel 10 adjacent the opening 12, the end 21 of the member 18 extends sufficiently beyond the surface 20 to overlay the indicia 16 on the disks. Preferably the elongated member 18 is arranged to telescopically extend or retract.

Figure 5:
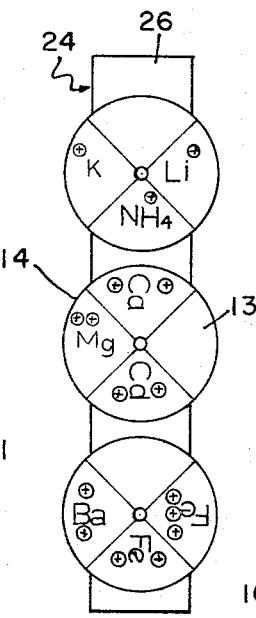
FIG. 5 is a schematic view of an alternative embodiment showing a clip of disks.
Figure 6:
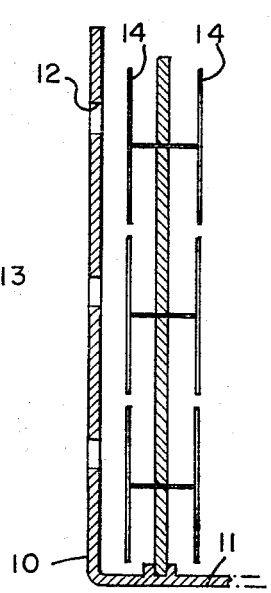
FIG. 6 is a side view of FIG. 5.

Referring now to FIGS. 5 and 6, there is shown an alternate embodiment of the invention wherein a clip or rack of disks is provided. In this embodiment of the invention, disks 14 are provided on either side of a central support member 26. Preferably the disks are relatively rotatable to the central support 26. The central support 26 is preferably constructed and arranged to be positioned adjacent to the support panel so that the indicia on each disk is brought into register with the opening 12 proximate to each disk upon rotating the disk. The central support 26 can, for example, be held by the base 11. By means of the clip of disks, series, families, or groups of elements and radicals having similar valence signs or other similarities can be kept as a unit.

In accordance with another feature of my invention a color scheme may be employed. For example, the disk having indicia representing chemical elements and radicals having a positive valence can be provided with one dominant color while the disk representing chemical elements and radicals having a negative valence can be provided with another dominant color. In accordance with the present invention the positive valences are preferably provided with a dominant black color while the negative valences are preferably provided with a dominant yellow color. It is to be understood, however, that other color combinations can be employed. For example, the color can be arranged in conformity with the basic and acid color reactions to litmus. In this arrangement, the indicia on the disk representing elements and radicals with a positive valence are provided with a dominant blue color, while the indicia representing elements and radicals with a negative valence are provided with a dominant red color. In a like manner, the support or display panel 10 can be provided on one half with a dominant color of the disks on that half of the panel while the other half of the panel can be provided with the other dominant color in conformity with the disk employed on that side of the panel.

Specific examples of using the valence device of the present invention are illustrated by reference to FIG. 1 of the drawing. Here there is shown the valence theory involved in the formation of sulphuric acid ($H_2SO_4$) and calcium chloride ($CaCl_2$). In forming the sulphuric acid, the disk on the right of the panel is turned until the divalent radical $SO_4$ with two negative electrons is in register with the opening. It can be seen that the sulphate radical requires two positive valence electrons to satisfy its valence. It can be seen by rotating the disk on the positive side of the panel that hydrogen provides only one positive valence charge. One end of a valence bond is atached between the positive valence charge of the hydrogen and one of the negative charges of the sulphate radical. At this point it can be seen by visual inspection that the valence of the sulphate radical is not yet satisfied but requires an additional hydrogen with a positive valence charge. A second disk is then rotated to provide a second hydrogen with a positive valence charge and a valence bond is attached as described above in connection with the first hydrogen. Thus it can be readily seen that the valences are all satisfied. The formation of calcium chloride is carried out in a similar manner.

While the invention has been described with respect a preferred embodiment other embodiments can be employed within the scope of the invention. For example the elongated members 18 may be provided with magnetic end surfaces for attachment directly to the disks. In this embodiment the surface of the disks, or at least the area defined by the indicia 16, are formed of a magnetically attractive material. It is to be understood that the surface 20 can be a magnetically attractive material and the disks or valence areas designated by the indicia 16 can be a magnetic material. Additionally suitable means such as a pivotally mounted lid (not shown) can be provided adjacent each opening 12. In this manner the opening can be covered. Thus the blank space 13 can be provided with indicia.

Since certain changes may be made in the above apparatus without departing from the scope of the invention herein involved, it is intended that all material contained in the above description shall be interpreted as illustrative and not in a limiting sense.

What is claimed is:

1. A device for demonstrating the theory of chemical valence comprising a support panel, a plurality of openings in said support panel, disk members having a plurality of indicia representing chemical elements and radicals of negative valence charge, other disk members having a plurality of indicia representing chemical elements and radicals of positive valence charge, other indicia on each said disk members representing the valence charge of the respective elements and radicals, said disk members being rotatably positioned adjacent said support panel and adapted to bring said indicia respectively into register with said openings, elongated elements representing valence bonds, means for attaching said valence bonds to said support panel whereby one end of said elongated member is adjacent the indicia representing the positive valence of elements and radicals and the other end of said elongated member is adjacent the indicia representing the negative valence of elements and radicals thereby to provide visual satisfaction of valence electrons between combining elements and radicals.

2. The device of claim 1 wherein the disk members having indicia representing chemical elements and radicals of positive valence charge are positioned adjacent the openings on one portion of the support panel and the disk members having indicia representing chemical elements and radicals of negative charge are positioned adjacent the openings on another portion of said support panel adjacent said one portion.

3. The device of claim 1 wherein said means for attaching said valence bonds comprise magnetic means.

4. The device of claim 1 wherein the surface of said support panel is formed of a material selected from the group consisting of magnetically attractive metals and alloys and the elongated elements are provided with surfaces adjacent the ends formed of a material selected from the group consisting of magnetic metals and alloys.

5. The device of claim 1 wherein the indicia of the disks is arranged so that a portion of the disks is free of indicia whereby said free portion may be brought into register with the openings by rotation of said disks.

6. The device of claim 1 wherein a plurality of disks are attached about a central support member and relatively rotatable therewith, said central support member being adapted to be positioned adjacent said support panel whereby the indicia on the disks adjacent the support panel are respectively brought into register with the openings on the support panel adjacent each disk.

References Cited

UNITED STATES PATENTS 2,293,405  8/1942  Russell _____ 35—18
2,965,980  12/1960  Day _____ 35—74 X EUGENE R. CAPOZIO, *Primary Examiner.*

W. H. GRIEB, *Examiner.*